United States Patent [19]

Aragaki

[11] Patent Number: 4,992,887

[45] Date of Patent: Feb. 12, 1991

[54] METHOD OF STORING AND TRANSMITTING IMAGE DATA AS AN IMAGE FILE SUITABLE FOR AN IMAGE SEARCH

[75] Inventor: Masami Aragaki, Kyoto, Japan

[73] Assignee: Dainippon Screen Mfg. Co., Ltd., Japan

[21] Appl. No.: 306,573

[22] Filed: Feb. 3, 1989

[30] Foreign Application Priority Data

Feb. 6, 1988 [JP] Japan .................................. 63-26161

[51] Int. Cl.⁵ .............................................. H04N 1/00
[52] U.S. Cl. ...................................... 358/403; 358/451
[58] Field of Search ............... 358/102, 403, 451, 450, 358/453, 452, 462

[56] References Cited

U.S. PATENT DOCUMENTS

| | | | |
|---|---|---|---|
| 4,506,342 | 3/1988 | Yamamoto | 358/403 |
| 4,520,399 | 5/1988 | Iida | 358/451 |
| 4,768,099 | 8/1988 | Mukai | 358/403 |

Primary Examiner—Edward L. Coles, Sr.
Attorney, Agent, or Firm—Ostrolenk, Faber, Gerb & Soffen

[57] ABSTRACT

An image file consists of a file header, reduced-and-compressed image data, and compressed original image data. The reduced-and-compressed image data is obtained by compressing reduced image data expressing a reduced image of an original image in serial order of bit planes. The reduced image is then reproduced and displayed on an image display for an image search, in place of the original image itself, whereby efficiency in an image search is improved.

25 Claims, 13 Drawing Sheets

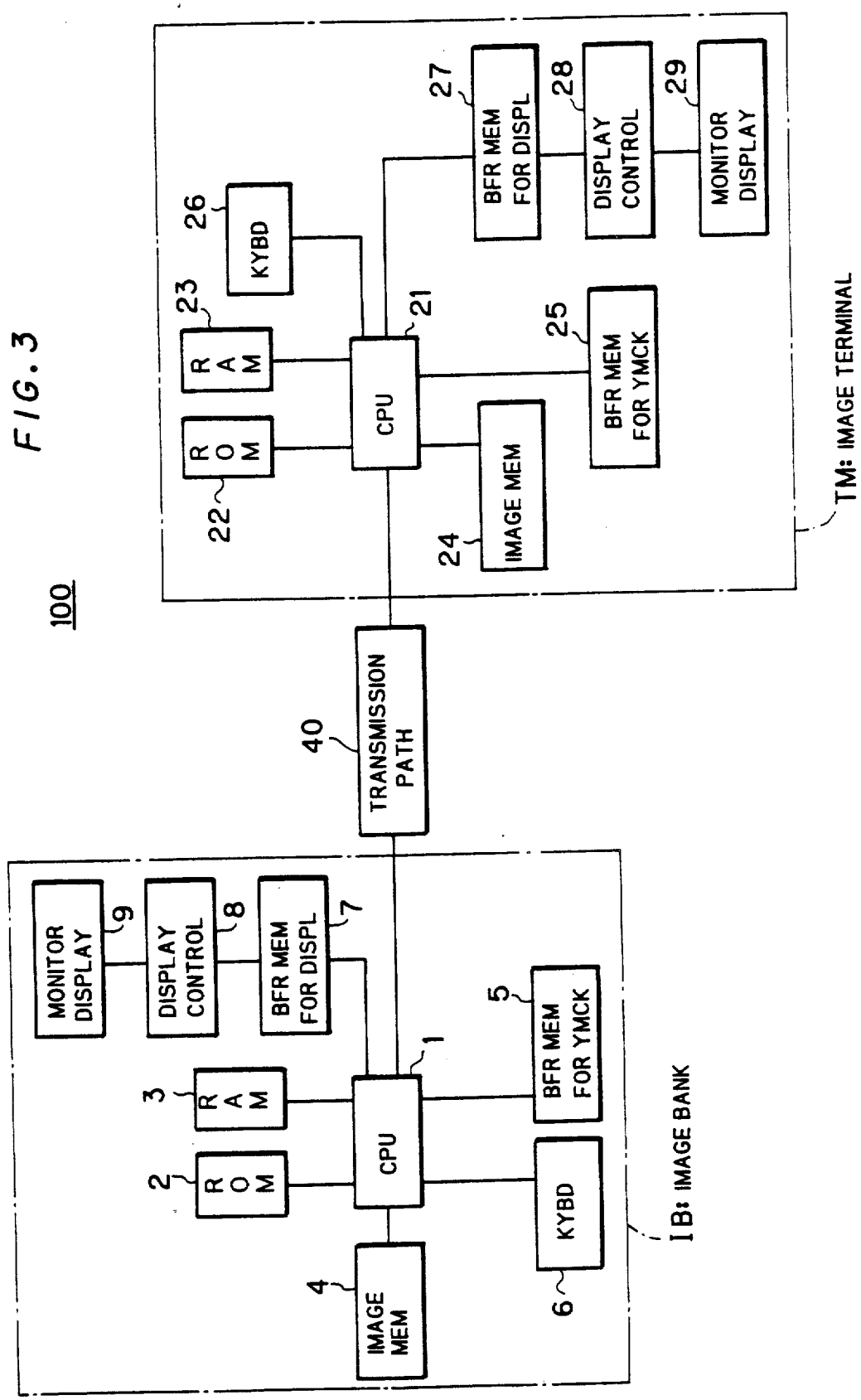

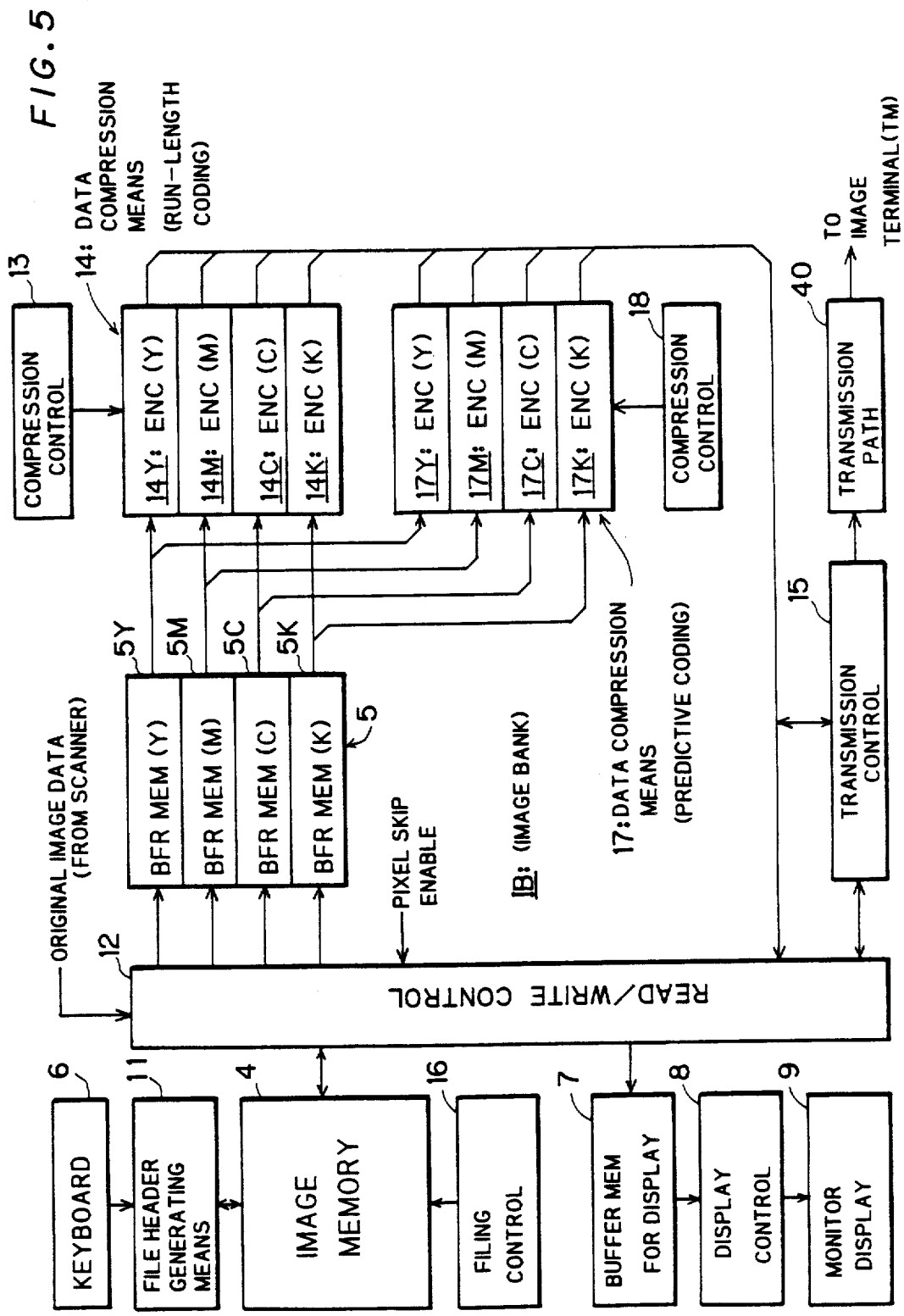

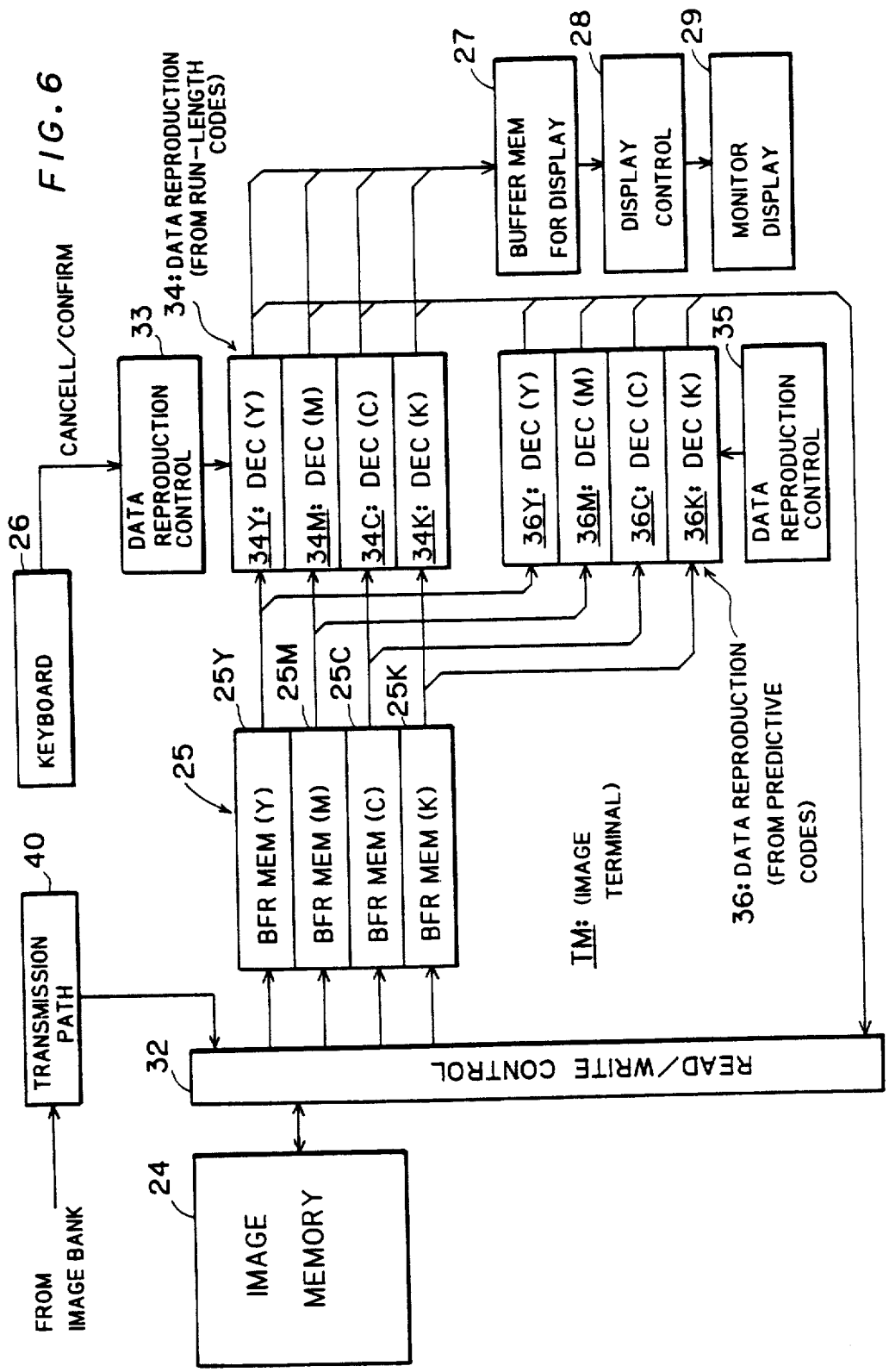

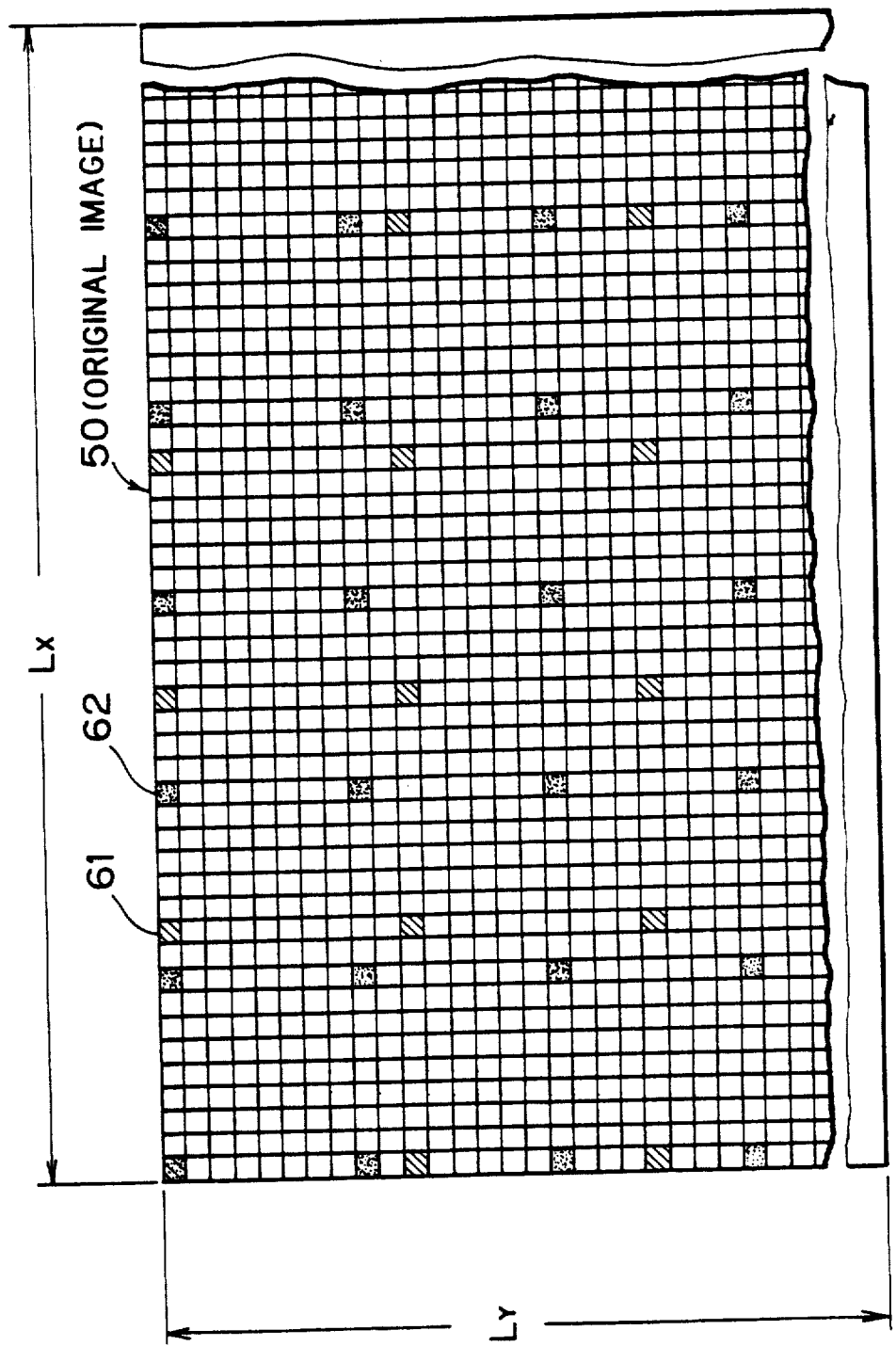

REDUCED IMAGE DATA FOR Y-COMPONENT

COMPRESSION INTO RUN-LENGTH CODES

METHOD OF STORING AND TRANSMITTING IMAGE DATA AS AN IMAGE FILE SUITABLE FOR AN IMAGE SEARCH

BACKGROUND OF THE INVENTION

1. Field of the Invention

The present invention relates to a method of storing and transmitting image data, and more particularly to an image data format suitable for an image search using an image display.

2. Description of the Background Art

In general, original image data obtained by reading an original is stored or transmitted in the form of an image file in which the original image data follows a file header. An example of such an image file $IF_M$ is illustrated in FIG. 1, and the file header includes information for identifying the filed image.

When the amount of the original image data is very large, the original image data is often compressed through a data compression technique and then filed in the form of an image file $IF_N$ shown in FIG. 2, in order to reduce memory capacity required for storing the original image data. Image data requiring the data compression are classified into two types, one of which is that expressing an original image of large size and the other is that having a fine pixel pitch. For example, about 245 megabytes are required for storing a color image of A2 size with a pixel pitch of 160 pixels/cm, as a total capacity for color components of yellow (Y), magenta (M), cyan (C) and black (K). By means of the data compression, the required memory capacity is reduced so that such an original image data can be stored in an image memory whose capacity is not quite large.

However, even if an original image data is compressed, the amount of the original image data is still large, and a relatively large time is required for fully displaying the original image on a display device through serial access of the original image data. Therefore, when a plurality of images are serially displayed on a display device in order to find a desired original image within the plurality of images, the total time until the desired original image is found is inevitably long. Furthermore, if the respective sizes of the filed images are large, a display device of large size and an image buffer memory of large capacity must be prepared. Since a display device having a quite large size is not practical, each of the filed original images should be displayed part by part if the respective sizes of the filed original images are larger than the size of an ordinary display device.

SUMMARY OF THE INVENTION

The present invention is intended for a method of storing an image file in a memory means that is provided in an image processing system having an image display usable for an image search.

According to the present invention, the method comprises the steps of: (1) preparing first image data expressing an original image; (2) generating second image data expressing a reduced image of said original image, the size of said reduced image being equal to or smaller than the display size of the image display; (3) producing a file header including an identification data for identifying the image file; and (4) storing a combination of the file header and the first and said second image data in said memory means as the image file.

The reduced image is displayed on the image display for the image search. Since the size of the reduced image is equal to or smaller than the display size of the image display, the whole of the reduced image can be displayed on the image display. Consequently, the image search is easily done as compared with a case where the original image itself is displayed. The storage capacity of a display buffer memory may be small, because the data amount of the reduced image is less than that of the original image. Furthermore, the time and cost required for the image search is decreased, so that efficiency in the image search is improved.

Preferably, the second image data is a reduced and compressed image data obtained by compressing a reduced image data expressing the reduced image for each pixel. The data compression may be conducted in serial order of bit planes. In the preferred embodiment, a run-length coding rule is applied to the data compression. In order to further save the storage capacity, the first image data may be prepared by compressing an original image data expressing the original image for each pixel.

The present invention may be also applied to a method of transmitting the image data. The image file including the combination of the file header and the first and second image data is transmitted to another image processing system having an image display.

Preferably, the second image data expressing the reduced image is transmitted prior to the first image data expressing the original image. An operator or user can observe the reduced image on the image display in order to find whether the transmitted image file is a desired one or not. When the second image data is that expressing the reduced image in serial order of bit planes, the gradation of the reduced image being displayed becomes fine step by step. If the operator finds that the displayed image is not a desired image, the operator inputs a cancellation command in order to stop or cancel the data transmission of the remaining part of the image file. Apparatus useful for the present method is also provided in the preferred embodiment.

Accordingly, an object of the present invention is to provide a method of storing or transmitting an image file a form suitable for an image search.

Another object of the present invention is to conserve the storage capacity of a display buffer memory.

Further, another object of the present invention is to replace the time and cost required for an image search or image retrieval.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing an image communication system according to a preferred embodiment of the present invention, FIG. 5 is a block diagram showing the function of an image bank, FIG. 6 is a block diagram showing the function of an image terminal, FIG. 8A shows a pixel array on the original image, where white squares or pixels are skipped for image reduction, FIG. 12A to FIG. 12E, and FIGS. 13 through 16, 17A–17B and 18A–18B show image files according to other preferred embodiments of the present invention.

DESCRIPTION OF THE PREFERRED EMBODIMENTS

A. Hardware Structure

Figure 1:
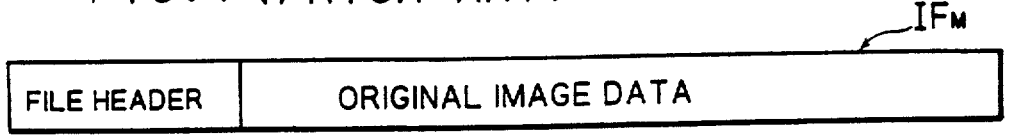
FIG. 1 and FIG. 2 show conventional image files.
Figure 2:
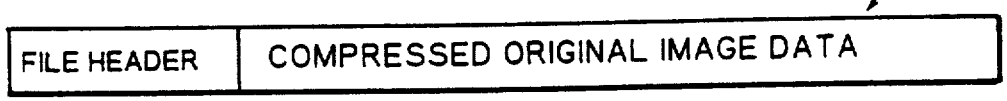

FIG. 3 is a block diagram showing an image communication system 100 according to a preferred embodiment of the present invention. The system 100 comprises an image bank IB for filing an original image data therein, and an image terminal TM to which the original image data and other data are transmitted from the image bank IB through an image transmission path 40. As will be described later, the data transmitted through the path 40 are encoded data and the image terminal TM decodes the encoded data. Although only one terminal TM is illustrated in FIG. 1, a plurality of image terminals may be coupled to the image bank IM through the image transmission path 40. The image bank IB is placed in a data production room, while the image terminal TM is placed at a user's side. The image transmission path 40 may be a public telephone line, a dedicated digital communication line, an optical signal line or the like.

The image bank IB has an image memory 4 for storing the original image data in the form of an image file, which may be a magnetic disc. A ROM 2 and a RAM 3 are provided in the image bank IB for storing an operation program for a CPU 1 and other data. The image bank IB has two buffer memories 5 and 7. The buffer memory 5 is provided for buffering color-component data of Y, M, C and K in an image filing process. The other buffer memory 7 is coupled to a monitor display 9 through a display controller 8, and is operable to buffer an image to be displayed. The monitor display 9 may be a color CRT having an arbitrary size. A keyboard 6 is connected to the CPU 1 for manually inputting commands and various data.

The image terminal TM has similar structure to the image bank IB, and comprises a CPU 21, a ROM 22, a RAM 23 and an image memory 24. A buffer memory 25 for color components of Y, M, C and K and another buffer memory 27 for a monitor display 29 are also provided in the image terminal TM. The monitor display 29 may be a color CRT having an arbitrary size, and is controlled by a display controller 28. The function of the CPU 21 is different from that of the CPU 1 provided in the image bank IB, as will be described below.

B. Overall Operational of Image Communication System

Figure 4A:
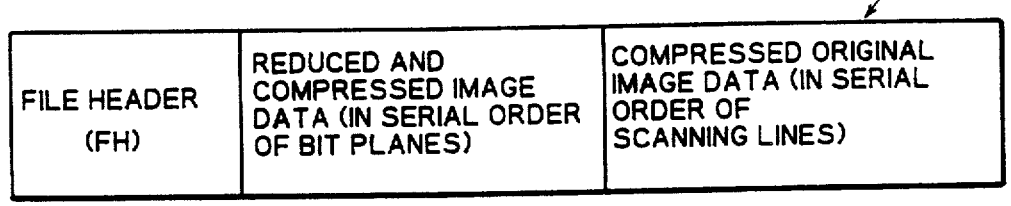
FIG. 4A shows an image file according to the preferred embodiment.
Figure 4B:
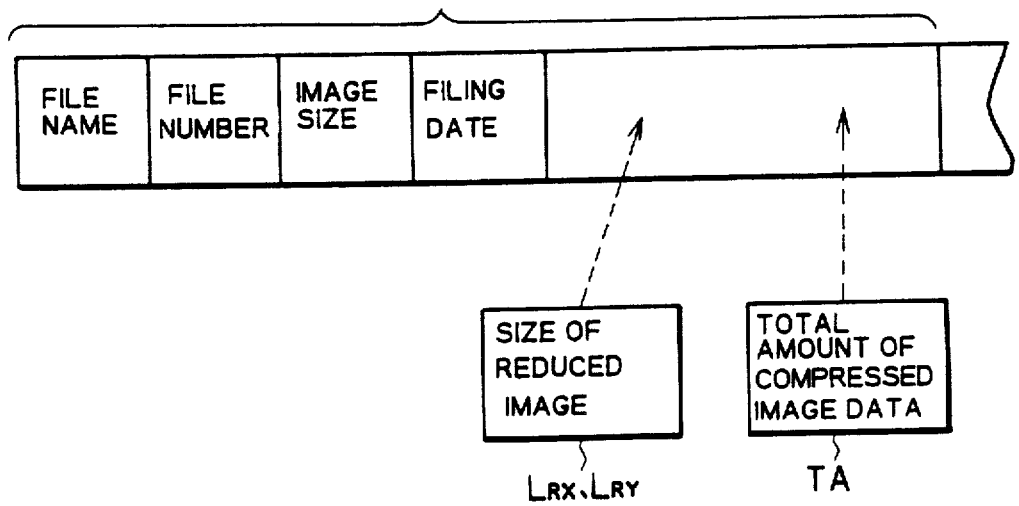
FIG. 4B shows the details of a file header included in the image file shown in FIG. 4A.

The image communication system 100 operates as follows: First, original image data expressing an original image for each scanning line is inputted to the image bank IB. Identification data for identifying an image file to be produced is also inputted to the image bank IB. The image bank IB transforms the original image data into a reduced image of the original image. The reduced image data is subjected to data compression, whereby reduced-and-compressed image data is obtained. The identification data is combined with a value expressing the size of the reduced image and another value indicating the total amount of the reduced-and-compressed image data, whereby a file header FH shown in FIGS. 4A and 4B is produced.

Then, the original image data is subjected to another data compression, to become compressed original image data. The file header, the reduced-and-compressed image data, and the compressed original image data are stored in the image memory 4 in the form of an image file $IF_1$ shown in FIG. 4A.

The image file $IF_1$ can be transmitted to the image terminal TM through the transmission path 40 to be stored in the image memory 24. Search for a desired original image may also be attained by displaying the reduced image on the monitor display 29.

FIG. 5 is a block diagram showing a part of the image bank IB as a combination of function blocks. Means 11–18 are embodied with the function of the CPU 1. Similarly, a part of the image terminal TM is illustrated in FIG. 6, where means 32–36 are embodied with the function of the other CPU 21.

In the following sections, the respective process steps for attaining the above-indicated operation will be described in detail along the process sequence, with reference to FIGS. 3–6.

C. Image Data Filing (c-1) Input of Original Image Data and Identification Data Referring to FIG. 5, original image data expressing the original image for each color component (Y, M, C and K) is inputted to the image bank IB through input means (not shown) such as a color image scanner. The original image data have eight bits per pixel for each color component Y, M, C and K, whereby the color density or gradation level on each pixel is expressed within $2^8 = 256$ levels. The original image data is stored in the image memory 4.

Then, an operator inputs the identification data through the keyboard 6, where the identification data may include an image file name, a file number, the size of the original image, a filing date, and other information useful for identifying the image file to be produced. A file header generating means 11 (FIG. 5) receives the identification data and then arranges the identification data to thereby generate the file header FH shown in FIG. 4B. The file header FH is stored in the image memory 4, where the "size of the reduced image" and the "total amount of compressed image data" shown in FIG. 4B have not been specified in the file header FH yet.

(c-2) Generation of Reduced Image

Figure 7A:
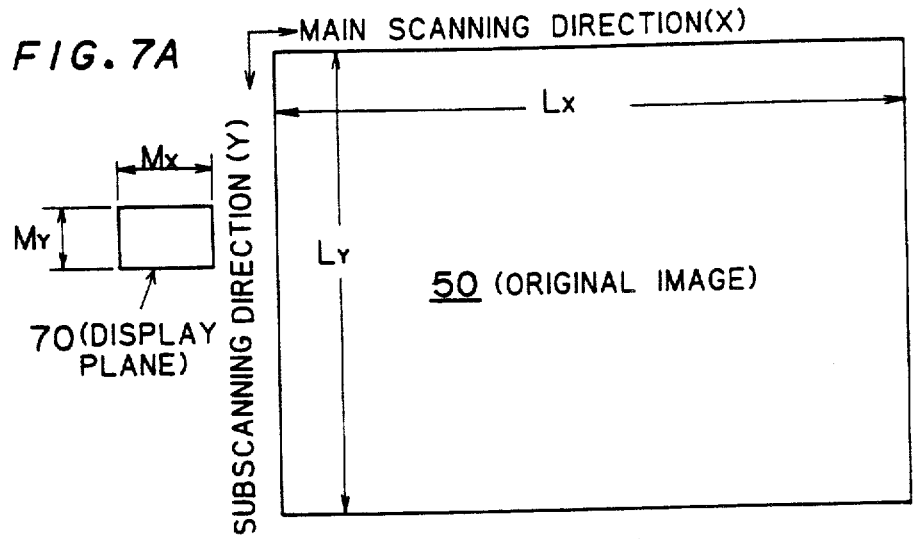
FIG. 7A shows the respective sizes of an original image and a display plane.

In order to fit the size of the reduced image to that of the monitor display 9 or 29, an image-reduciton means 12 (FIG. 5) determines a reduction ratio as follows: First, the respective minimum integers $I_X$ and $I_Y$ satisfying the conditions:

$$I_X \cdot M_X \geq L_X \quad (1)$$

$$I_Y \cdot M_Y \geq L_Y \quad (2)$$

are calculated, where, as shown in FIG. 7A, $M_X$, $M_Y$ define the size of the display plane 70 of the monitor display 9 or 29 in the main scanning direction X and the subscanning direction Y, the directions X and Y being defined according to image scanning for display, and $L_X$, $L_Y$ define the size of the original image 50 in the directions X and Y.

Then, the larger one of the integers $I_X$ and $I_Y$ is selected to determine an integer $I_M$, i.e., $$I_M = \text{MAX}[I_X, I_Y] \quad (3)$$

As understood from the expressions (1)–(3), the integer $I_M$ is the minimum integer satisfying both of the conditions:

$$I_M \cdot M_X \geq L_X \quad (4)$$

$$I_M \cdot M_Y \geq L_Y \quad (5)$$

Figure 7B:
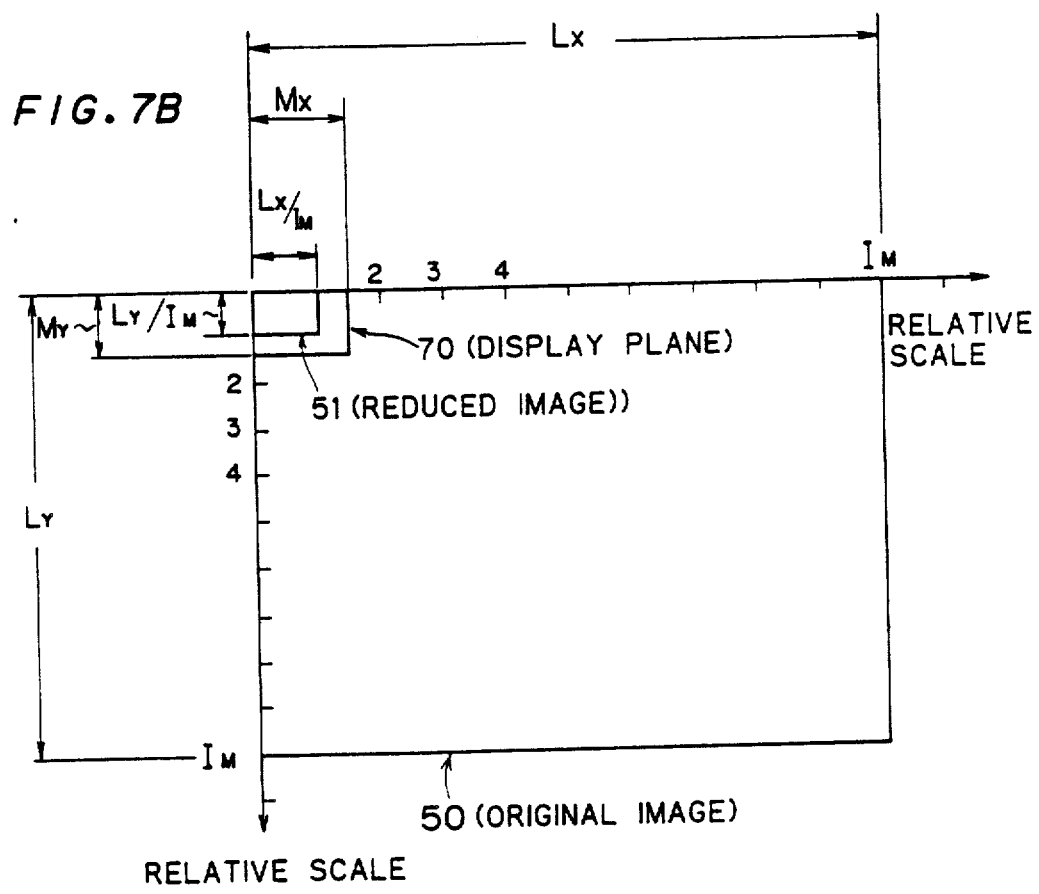
FIG. 7B is an explanatory diagram showing a reduction process.

The inverse of the integer $I_M$ is employed as the reduction ratio, whereby the whole of the reduced image 51 (FIG. 7B) can be displayed on the inside of the display plane 70 without a wide margin. In other words, the size of the reduced image 51 is equal to or slightly smaller than that of the display plane 70. In the preferred embodiment, a standard value for the reduction ratio is set at "⅛". Only when the reduction with the reduction ratio "⅛" is insufficient to display the reduction image on the display plane, the reduction ratio is forced to be "$1/I_M$", i.e., $$1/R \text{ (Reduction Ratio)} = \text{MIN } [1/I_M, \tfrac{1}{8}] \quad (6)$$

This is because the size of the original image is often eight times the size of a standard monitor display, and the standard value "⅛" is suitable for many original images. The value of the reduction ratio 1/R is stored in a registor (not shown).

The reduction ratio may be determined according to only one of the integers $I_X$ and $I_Y$. If respective shapes of the original image 50 and the display plane 70 are squares, the reduction ratio according to one of $I_X$ and $I_Y$ is the same as that determined through expressions (1)–(6). Even if the integers $I_X$ and $I_Y$ are different from each other, the reduction ratio according to one of $I_X$ and $I_Y$ can be employed. This is because the reduced image is mainly used for finding a desired image within a plurality of filed images, and the reduced image may be displayed with its minor part being out of the display plane 70 in one of the directions X and Y.

Figure 8B:
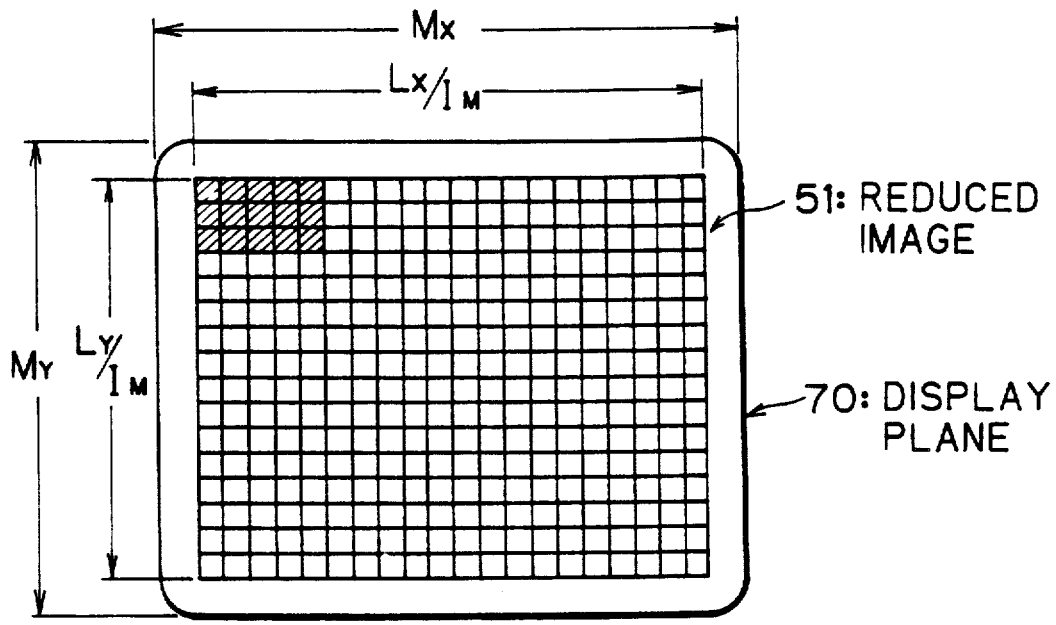
FIG. 8B and FIG. 8C show examples of the reduced image.
Figure 8C:
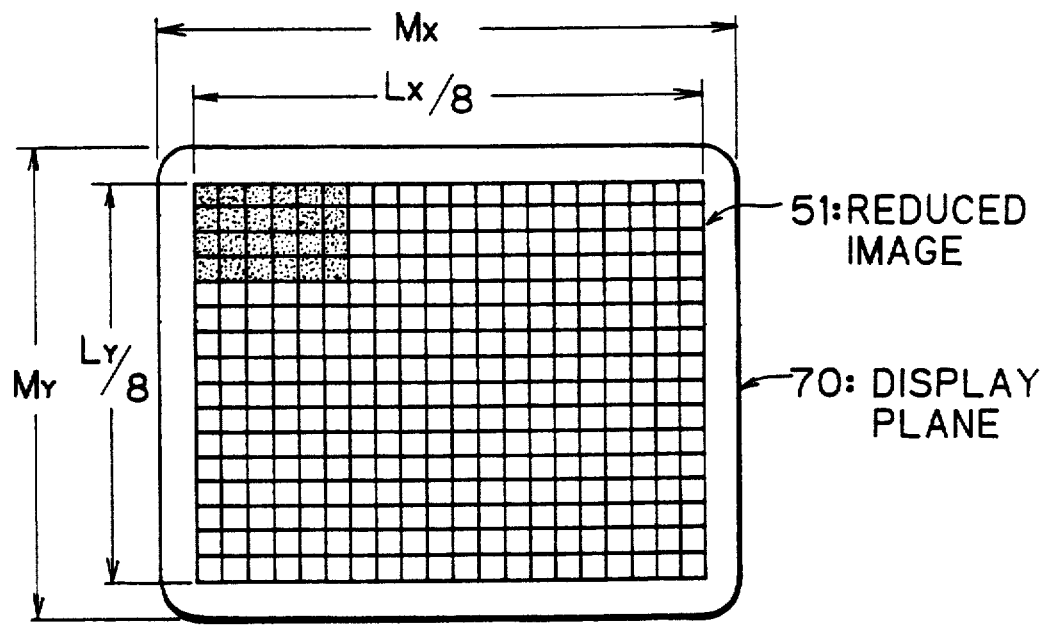

In order to generate the reduced image, the original image data is read-out from the image memory 4 while being skipped every R pixels by a read/write control means 12 (FIG. 5) in both the main scanning direction X and the subscanning direction Y. If a pixel array corresponding to the original image 50 has the structure shown FIG. 8A and the reduction ratio 1/R is "1/10", the pixels other than the pixels 61 indicated with slanted lines are skipped and the reduced image data expressing the reduced image is generated. FIG. 8B shows a pixel array expressing the reduced image 51, where the pixels indicated with slanted lines in FIG. 8B correspond to those illustrated in FIG. 8A. If the reduction ratio 1/R is "⅛", the pixels other than the pixels 62 indicated with dots are skipped, whereby the reduced image 51 shown in FIG. 8C is generated.

Through the skipping process, the amount of image data is reduced by a factor of $(1/R^2)$. Since the upper limit of the reduction ratio 1/R is set at "⅛", the reduction factor $(1/R^2)$ in data amount is smaller than $(\tfrac{1}{8}^2) = 0.015625$ (about 1.6 percents). Therefore, the memory capacity required for storing the reduced image 51 is much smaller than that for the original image 50 itself.

The image reduction may be conducted with another method. For example, each pixel on the reduced image 51 may be obtained by taking an average of the original image data for each cluster having $R^2$ (i.e., two or more) pixels. The average may be a weighted average. If the weight for the weighted average is "1" for every R-th pixels along the X(Y) direction and is "0" for other pixels, the weighted average is just the pixel skipping described above. Furthermore, when the original image data are gradation data such as in the present case, the less significant bits may be deleted in the reduced image in order to further decrease the amount of data.

The reduced image data for Y, M, C and K colors thus obtained are delivered to buffer memories 5Y–5K (FIG. 5) to be temporarily stored therein, respectively.

(c-3) Data Compression of Reduced Image

Figure 9A:
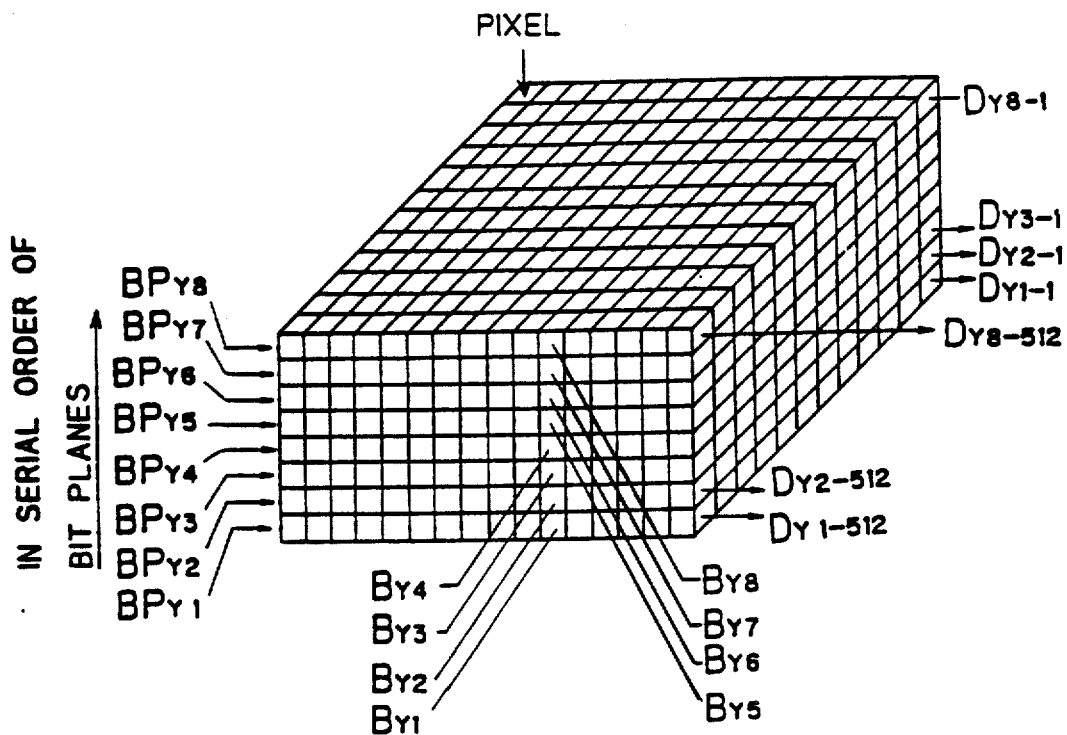
FIG. 9A is a schematic diagram showing a bit hierarchy consisting of bit planes.
Figure 9B:
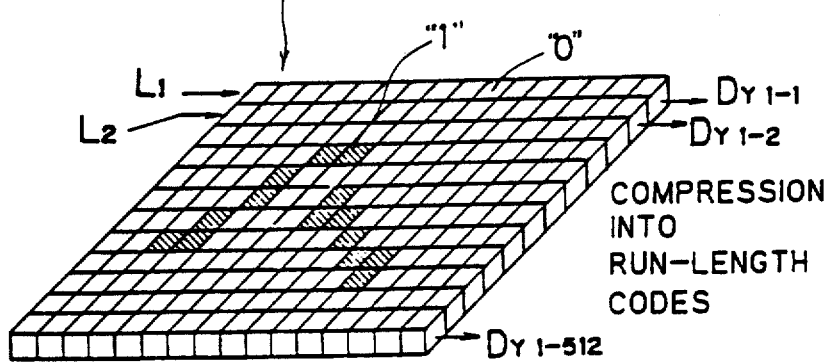
FIG. 9B is a schematic diagram showing the first bit plane consisting of respective most significant bits of the original image data.

The reduced image data consists of color components of such Y, M, C and K, each of color components being expressed by 8 bits for each pixel. FIG. 9A is a schematic diagram showing a bit hierarchy of the Y-component in the reduced image, where 8 bit data $B_{Y1}$–$B_{Y8}$ for each pixel are illustrated as cubic cells stacked in the vertical direction. The cubic cells are also arrayed in the horizontal direction according to the pixel array in the reduced image. The lowest plane $BP_{Y1}$ consisting of the most significant bits (MSB) $B_{Y1}$ for respective pixels is "a first bit plane", while the plane $BP_{YJ}$ consisting of J-th significant bits $B_{YJ}$ for respective pixels is "an J-th bit plane". FIG. 9B shows the first bit plane extracted from the bit hierarchy. Since the most significant bit $B_{Y1}$ through the least significant bit $B_{Y8}$ are stacked in that order, a rough level in image gradation is expressed by a lower bit plane, while a fine level is expressed by a higher bit plane in the bit hierarchy. The bit hierarchy formed by the bit planes can be defined also for each of other color components M, C and K.

Figure 10:
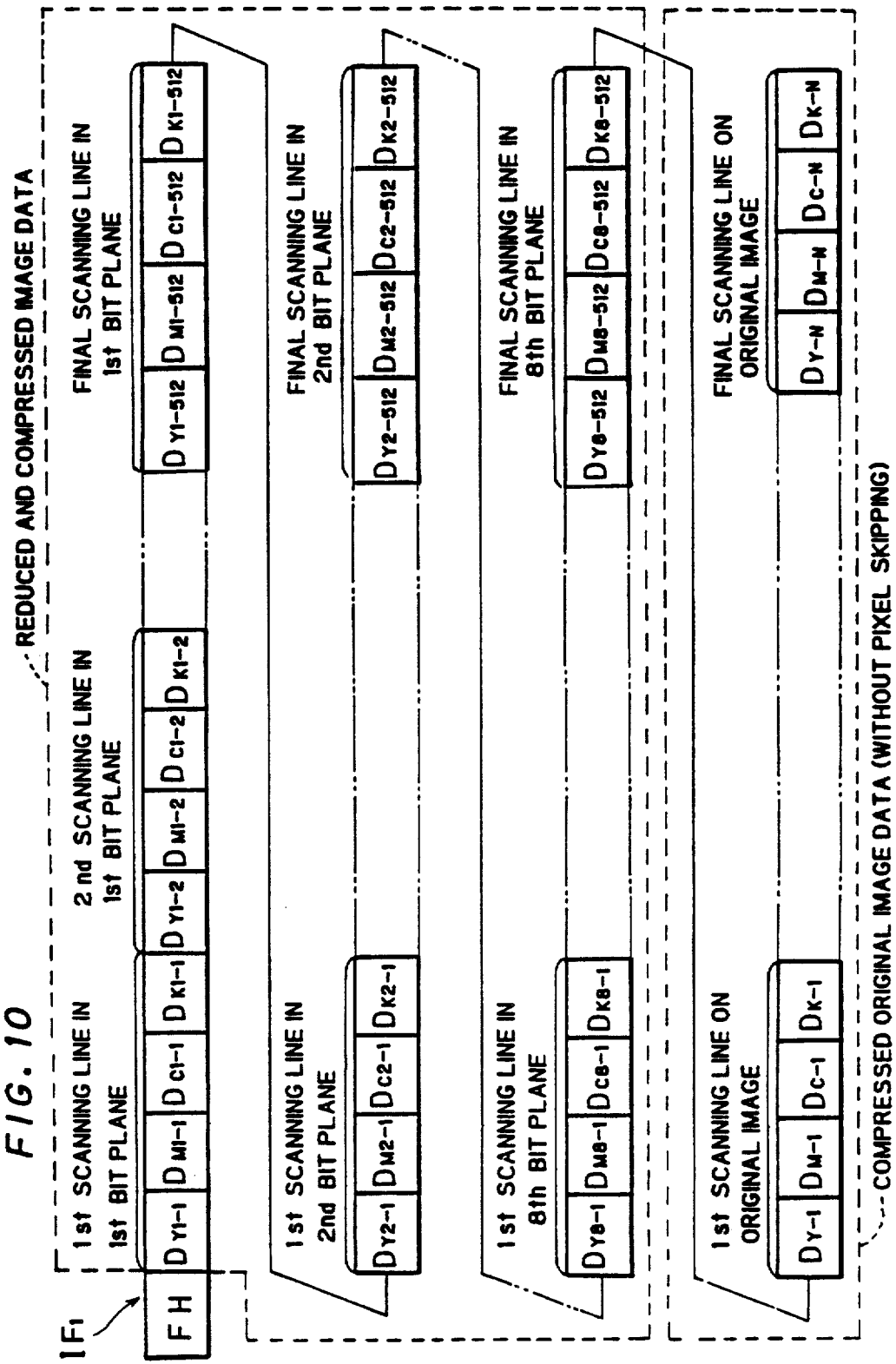
FIG. 10 shows the details of the image file shown in FIG. 4A.

Referring to FIGS. 9A–9B and to FIG. 5, the most significant bits $B_{Y1}$ for respective pixels belonging to a first main scanning line $L_1$ (FIG. 9B) are read out from the buffer memory 5Y along the pixel alignment. The most significant bits $B_{Y1}$ are delivered in series to an encoder means 14Y, which is included in a data compression means 14 together with other encoder means 14M–14K. The encoder means 14Y is operable to encode the sequence of the most significant bits $B_{Y1}$ into a set of run-length codes, to thereby compress the data amount of the most significant bits $B_{y1}$ in the first scanning line $L_1$. The reduced and compressed image data $D_{y1-1}$ thus obtained is transmitted to the image memory 4 and is stored in an address next to the file header FH, as shown in FIG. 10, under the control of a filing control means 16 (FIG. 5).

Similar process steps are repeated also for M, C and K colors, whereby the reduced and compressed image data $D_{M1-1}$, $D_{C1-1}$ and $D_{K1-1}$ for the first scanning line $L_1$ are generated on the basis of the bit values provided in the first bit planes of respective colors. The reduced-and compressed image data $D_{y1-1}$ through $D_{K1-1}$ are stored in the image memory 4 as a part of the image file $IF_1$, as shown in FIG. 10.

The above-indicated process is repeated according to the multi-repetition loop consisting of;

(a) a minor repetition loop for Y, M, C and K;
(b) an intermediate repetition loop for the first through last scanning lines; and
(c) a major repetition loop for the first through eighth bit planes.

where the repetition control is conducted by a compression control means 13 (FIG. 5) operable to select and enable the encoder means 14Y-14K cyclically for Y, M, C and K components.

The reduced-and-compressed image data thus obtained are stored in the image memory 4 as a part of the image file $IF_1$. As shown in the first through third rows of FIG. 10, the reduced-and-compressed image data (the run-length data or codes) are so arranged in the image file $IF_1$ that the run-length data $D_{Fi-j}$ are arranged in an ascending order for i and j, where:

F (Color Index) = Y, M, C and K, i (Bit Plane Index) = 1–8, and j (scanning Line Index) = 1–512.

It is to be noted that the run-length data obtained from the same bit plane are gathered to form a subsequence, and respective sub-sequences for the bit planes are arranged according to the bit hierarchy or in serial order of the bit planes. Within each of the subsequences, the respective run-length data for the scanning lines are aligned according to the order of the scanning lines. For example, the subsequence for the second bit plane is located at the storage area next to that for the first bit plane, and the run-length data for the second scanning line $L_2$ (FIG. 9B) are located at the area next to that for the first scanning line $L_1$ in the image file $IF_1$. End codes for designating the respective ends of the scanning lines and those of the subsequences are provided at their respective end positions in the image file $IF_1$.

(c-4) Complement to File Header FH

After the reduced-and-compressed image data are stored in the image memory 4, the CPU 1 calculates the size of the reduced-and-compressed image through the equations:

$$L_{RX} = L_X / R \quad (7)$$

$$L_{RY} = L_Y / R \quad (8)$$

where $L_{RX}$ and $L_{RY}$ are the size of the reduced-and-compressed image in the main scanning direction and the subscanning direction, respectively. Furthermore, the CPU 1 calculates the total amount TA of the reduced-and-compressed image by summing up the respective amount of the run-length data. The respective values indicating the size $L_{RX}$, $L_{RY}$ and the total amount TA are stored in the image memory 4 as a part of the file header FH (FIG. 4B), whereby the generation of the file header FH is completed. The file header FH may consist of 512 bytes, for example.

(c-5) Compression of Original Image Data

Then, the original image of data of 8 bits for Y-component on the first scanning line are read out from the image memory 4 to be delivered to the buffer memory 5Y without skipping the pixels. The original image data are then transmitted to an encoder means 17Y, and compressed therein through a predictive coding rule for each scanning line. That is, an expected value of the original image data for a pixel is estimated from that of the preceding pixel, and then the deviation from the expected value is calculated to be coded into compressed original image data $D_{y1}$ for each pixel, where the data length of the data $D_{y1}$ is variable according to the result of the data compression. A set of the compressed original image data $D_{y1}$ thus obtained for the first scanning line are delivered to the image memory 4, to be stored at the area next to the reduced-and-compressed image data in the image file $IF_1$ (FIG. 10).

The above-indicated process is repeated according to a multi-repetition loop consisting of:

(a) a minor repetition loop for Y, M, C and K; and
(b) a major repetition loop for the first through last scanning lines;

where the repetition control is conducted by another compression means 18 (FIG. 5) operable to select and enable the coding means 17Y-17K cyclically for Y, M, C and K-components.

Accordingly, the respective compressed image data $D_{F-L}$ are arranged in the image file $IF_1$ in serial order of the scanning lines as shown in FIG. 10, where:

F = Y, M, C and K;

L (Scanning Line Index) = 1 – N; and

N = the number of the scanning lines.

It is to be noted that the number N of the scanning lines is that on the original image, while the number "512" indicated in the respective right ends of the first through third rows in FIG. 10 is the number of the scanning lines on the reduced image. Therefore, the numbers N and "512" are related with each other through the expression:

$$512 = N/R \quad (9)$$

As shown in FIG. 4A and FIG. 10, the image file $IF_1$ consists of the file header FH, the reduced-and-compressed image data, and the compressed original image data. Other image files for other original images can be produced through a similar process, and the image files thereof are also stored in the image memory 4.

D. Image Data Transmission

When it tis desired that an image file stored in the image memory 4 be transmitted to the image terminal TM, a user inputs the identification data for the desired image file with the keyboard 26 (FIG. 3) in the image terminal IT. The identification data is transmitted to the image bank IB through the transmission path 40 under the control by the CPU 21. On receiving the identification data, the CPU 1 in the image bank IB compares the transmitted identification data with those of the image files stored in the image memory 4, to thereby find an image file having the same identification data with that transmitted from the image terminal TM.

The image file thus found is read-out from the image memory 4, and then, the file header FH, the reduced-and-compressed image data and the compressed original image data included therein are transmitted to the image terminal TM through the transmission path 40 in series. The order of the data transmission is the same with the image filing described above, and therefore, the data included in the image file are transmitted in the order shown in FIG. 10.

In the present image communication system 100, it is also possible to transmit the image file without a previous image filing. That is, when the original image data designated by the received designation data has not been arranged in the form of an image file yet, the CPU 1 starts to produce the reduced-and-compressed image data and the compressed original image data, and then, the produced image data are transmitted to the image terminal TM without being stored in the image memory 4.

In both cases, the transmitted image file is stored in the image memory 24 through a data receiver means (not shown), as a received image file. Alternatively, only the file header FH is stored in the image memory 24, while the reduced-and-compressed image data and the compressed original image data are stored in buffer memories 25Y-25K for each color component.

E. Image Data Reproduction and Image Display

Then, the file header FH is read out from the image memory 24 through a read/write control means 32 (FIG. 6). The respective data indicating the original image size, the reduced image size and the toral amount of the reduced-and-compressed image data are extracted from the file header FH, to be stored in a register (not shown). The read/write control means 32 read out the YMCK components $D_{Y1-1}$-$D_{K1-1}$ of the reduced-and-compressed image data from the image memory 24, where the components $D_{Y1-1}$-$D_{K1-1}$ are those for the first scanning line in the first bit plane. The respective ends of the components $D_{Y1-1}$-$D_{K1-1}$ can be recognized by detecting the respective end codes following them. The components $D_{Y1-1}$-$D_{K1-1}$ are stored in the buffer memories 25Y-25K, respectively.

An image data reproduction means 34 (FIG. 6) comprises a set of decoding means 34Y-34K for YMCK colors, which are cyclically selected and enabled by the data reproduction control means 33. The decoding means 34Y receives the data $D_{Y1-1}$ for a Y-component, and reproduces the reduced image data on the first scanning line in the first bit plane by decoding the run-length codes included in the data $D_{Y1-1}$. In the following description, a reduced image data reproduced for the j-th scanning line in the i-th bit plane will be referred to as "$d_{Fi-j}$", where the index F is Y, M, C and K. According to the symbol $d_{Fi-j}$, the reduced image data first reproduced is "$d_{Y1-1}$" having one bit per pixel. The data $d_{Y1-1}$ is delivered to the buffer memory 27, to be stored therein.

The display controller 28 reads out the data $d_{Y1-1}$ from the buffer memory 27 to display the reduced Y-image for one line on a first scanning line of the monitor display 29, where the displayed image is a binary image corresponding to a part of the first bit plane $BP_{Y1}$ for the first scanning line. Since the first bit plane represents the most significant bits for the respective pixels, the binary image is a linear array of pixels having respective color density levels of "0" 0 or "$2^7$ = 128". For example, if the reduced image for the first scanning line is expressed by a series of 8 bits;

```
[ 10000000 ]
[ 11000000 ]
[ 10100000 ]
[ 01000000 ]
[ 00100000 ]
      . . .
``` the reduced image currently displayed on the basis of the data $d_{Y1-1}$ is linear pixel array in which the respective Y-color densities on the pixels are expressed as; "128", "128", "128", "0", "0", . . .

Figure 11:
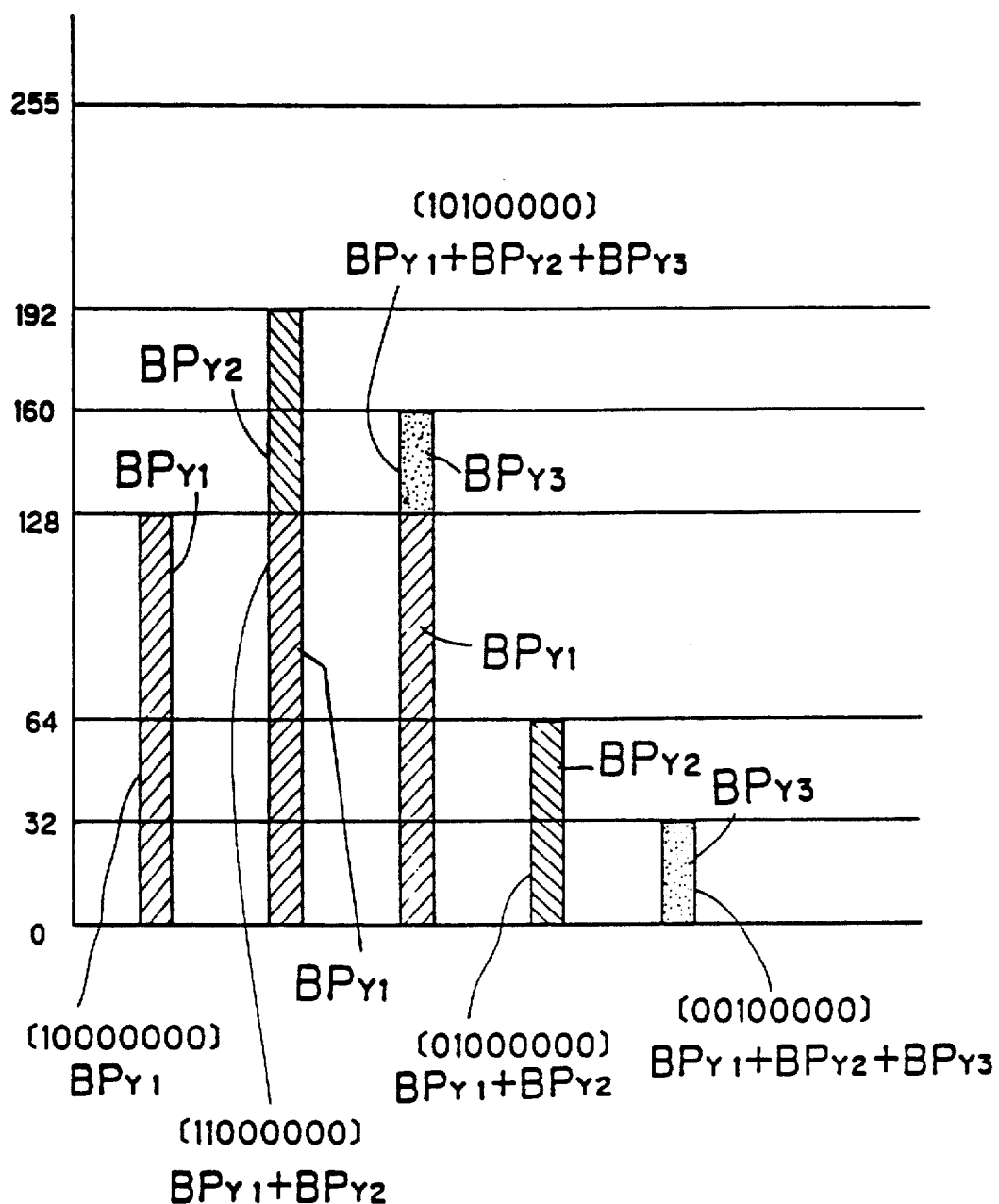
FIG. 11 is a graph showing gradation expressed by the more significant three bits.

The Y-color densities indicated above are schematically shown in FIG. 11 as bars indicated with the symbol "$BP_{Y1}$".

The process of displaying the line image on the first bit plane is repeated in series also for other colors M, C and K. More particularly, the decoder means 34M (34C, 34K) read out the data $D_{M1-1}$ ($D_{C1-1}$, $D_{K1-1}$) from the buffer memory 25M (25C, 25K) and decodes the run-length codes included therein, whereby image data $d_{M1-1}$ ($d_{C1-1}$, $d_{K1-1}$) on the first scanning line in the first bit plane are reproduced as those having one bit for each pixel.

Every time the image data $d_{M1-1}$ ($d_{C1-1}$, $d_{K1-1}$) are reproduced, the data are stored in the buffer memory 27. The data $d_{M1-1}$ ($d_{C1-1}$, $d_{K1-1}$) are then read out with the display controller 28, and the reduced linear image for M (C, K) color is displayed on the first scanning line of the monitor display 29 together with other color component(s) being already displayed. Therefore, when all of the color components for the first scanning line in the first bit plane are reproduced, a linear full color image having a rough color gradation is obtained on the first scanning line of the monitor display 29.

Figure 12A:
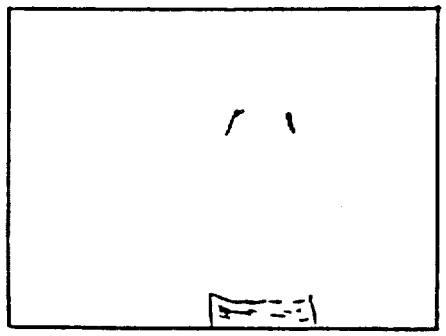
FIGS. 12A–12E show displayed images, where gradation becomes fine step by step in the order form

The process indicated above is repeated in series for the second through last scanning lines, and, when the reproduction of the first bit plane for all of the scanning lines is completed, a reduced full color image having a rough color gradation is displayed on the color monitor display 29. FIG. 12A is an example of the currently displayed image, which is an image having a rough color gradation as compared with the color image of 8 bits shown in FIG. 12E since only the respective most significant bits for pixels are used for the display.

Figure 12B:
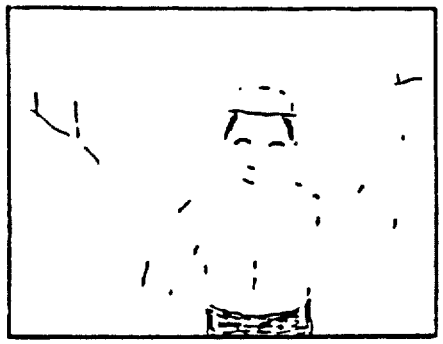

Then, the reduced-and-compressed image data $D_{F2-j}$ (F=Y, M, C and K, j=1-512) in the second bit plane are decoded in series, and the decoded image are displayed on the monitor display 29 while being overlapped or composed with the reduced image corresponding to the first bit plane. With respect to the Y-component, for example, the respective color densities of pixels in the composite image are expressed by the composite bars of BPY1 and BPY2 shown in FIG. 11. Since each of the composite gradation levels is expressed by the combination of the most significant bit and the second significant bit, the currently displayed image shown in FIG. 12B has a color gradation whose fineness is superior to that of the image shown in FIG. 12A.

Figure 12C:
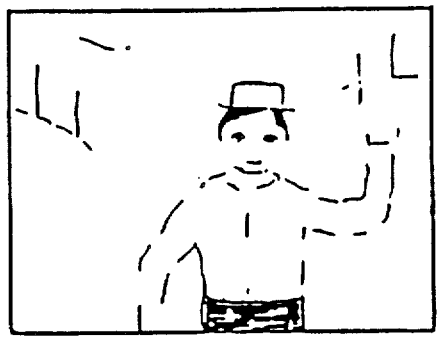
Figure 12D:
Figure 12E:
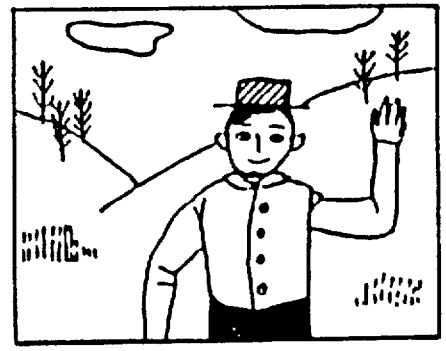
Figure 13:
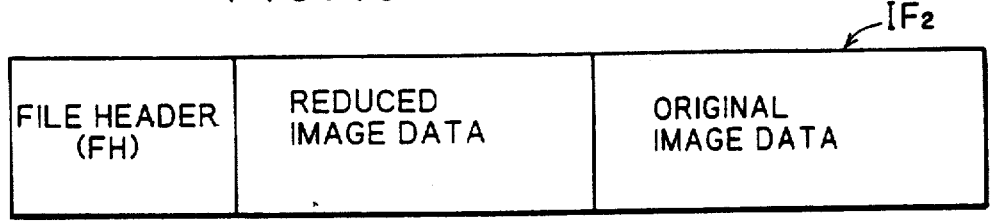

The above-indicated process is repeated also for the third through eighth bit planes, and the reduced image displayed on the monitor display 29 is increased step by step in its fineness of gradation, since the number of bits used for the display increases one by one from the most significant bit to the least significant bit. For example, the gradation levels including the most significant bit through the third significant bit, i.e., the first through third bit planes, are expressed as composite bars of $BP_{Y1}$, $BP_{Y2}$ and $BP_{Y3}$ as shown in FIG. 11, and the fineness is further increased as compared with the image expressed only by $BP_{Y1}$ and $BP_{Y2}$. FIG. 12C through FIG. 12E show the increase of the gradation fineness responsive to the accumulation of bits in each pixel. When all of the bit planes for the reduced image have been reproduced and combined with each other for the display, the color image on the monitor display 29 has a full gradation of 8 bits, and the reduced image can be fully recognized by the user, as shown in FIG. 12E. It is to be noted that the decoding for reproduction of the reduced image is conducted in time series for the bit planes; the respective images shown in FIG. 12 appearing on the monitor display 29 step by step. In other words, a reduced image having a relatively rough gradation can be observed prior to the full gradation image.

The user observes the monitor display 29 on which the reduced image gradually acquires its gradation. When it is found that the image being displayed is not the desired image, the user inputs a cancellation command from the keyboard 26 to cancel the request for display. In response to the cancellation command, the sequence for the decoding and the display is stopped, and no futher process is conducted for the current image. Then, the user inputs another identification data from the keyboard 26 in order to further try to retrieve the desired image file from the image bank IB. The new identification data is transmitted to the image bank IB; and the image file designated by the identification data is transmitted to the image terminal TM; and the process of decoding the run-length codes for displaying the reduced image is again carried out with respect to the transmitted new image file.

On the other hand, when the user finds at the display step of FIG. 12C, for example, that the reduced image being displayed is the desired image, the user inputs a confirmation command from the keyboard 26. In response to the confirmation command, the decoding process and the display process are stopped since the displayed image is already confirmed and no further display is required for the image search. If neither the cancellation command nor the confirmation command is inputted, the decoding process and the display process continue until the reduced image in full gradation appears on the monitor display 29.

When the decoding process and the display process are stoppted due to a confirmation command, the file header FH is accessed in order to find the information respecting the original image such as the its size. Then, the compressed original image data are read out in series from the image memory 24 for each scanning line and each color component, under the control by the read/write control means 32 (FIG. 6). The Y, M, C and K-components included in the compressed original image data are stored in the buffer memories 25Y-25K, respectively.

A decoder means 36Y, which is included in a data reproduction means 36 together with other decoder means 36M-36K, reads out the compressed original image data $D_{Y-1}$ (FIG. 10) for the first scanning line from the buffer memory 25Y, in order to decode the predictive codes included in the data $D_{Y-1}$. When the decoded or reproduced original image data are expressed by a symbol "$d_{Fj}$", where F = Y, M, C or K and j = 1 − N, the data that is reproduced first is "$d_{Y1}$" having 8 bits per pixel.

The other decoder means 36M-36K are then enabled in series, to decode the respective predictive codes of the data $D_{M-1}$, $D_{C-1}$ and $D_{K-1}$, respectively, whereby reproduced original image data $d_{M1}$, $d_{C1}$ and $d_{K1}$ for the first scanning line are obtained in time series. The reproduced original image data or color components $d_{Y1}$-$d_{K1}$ are stored in the image memory 24 in the form where the data $d_{Y1}$-$d_{K1}$ are correlated with the file header FH.

The above-indicated process is repeated in series also for the second through last scanning lines under the control of a data reproduction control means 35; accordingly a sequence of the reproduced original image data:

$$d_{Y1}\text{-}d_{K1}, d_{Y2}\text{-}d_{K2}, \ldots, d_{YN}\text{-}d_{KN}$$

is serially obtained and is stored stored in the image memory 24 so as to be correlated with the file header FH. Preferably, the sequence of the reproduced original image data is stored at the addresses next to that for the file header FH. The combination of the file header FH and the reproducted original image data can be used for arbitrary image processing such as image recoding, edition and the like. It is to be noted that the reproduced original image is not displayed on the monitor display 29 for image search, since it has been already found through the reduced image whether or not the image file transmitted from the image bank IB is the desired one.

F. Advantage of the Preferred Embodiment

According to the image communication system 100, the desired original image is retrieved by observing the reduced image on the monitor display 29. Since the reduced image is decreased in data amount as compared with the original image, the memory capacity of the display buffer memory 27 may be relatively small. Furthermore, the whole of the reduced image can be displayed on the monitor display 29 simultaneously, and therefore, it is easily found whether or not the displayed image is the desired one. The reduced image can be expressed by a relatively small amount of data, which is about 1.6 percent of that for the original image, for example, and the its transmission does not require a long time. Consequently, the time and effort required for an image search is decreased. Since the reduced image is dedicated to the image search, the reduction in image quality poses no problem.

The compression of the reduced image data in series of the bit plane is preferred for a rapid image search. Before the full gradation of the reduced image is displayed, the user can judge whether or not the image file being accessed is a desired one. On the other hand, the data compression for each scanning line is preferred for original image data that expresses a dense original image such as that for printing process. This is because such a dense original image requires a buffer memory having a large storage capacity, e.g., several hundred megabytes, when it is compressed for each bit plane. The required capacity of the buffer memory is several hundred kilobytes, for example, in the case where the original image data is compressed for each scanning line. However, when the original image is relatively light in density, such as a television image, the original image data may be compressed for each bit plane, since only about one megabyte is required in the buffer memory.

The image communication system 100 according to the preferred embodiment meets both of the two requirements, one of which is the rapidity of an image search and the other of which is the decrease of the memory capacity and of the data transmission time. Furthermore, when the reduced image is displayed prior to or in parallel with the transmission of the original image data, the transmission of the original image data can be stopped at the time when it is found that the original image is different from the desired one. This is quite effective in an image communication system using a transmission path such as a telephone line whose transmission speed is relatively low, because a relatively long time would be required until the whole of the original image data is transmitted.

G. Modifications of the Preferred Embodiment

The image communication system 100 described above can be modified to operate in various modes as follows;

(1) When it is desired to search the image memory 4 for a desired original image within the image bank IB, the reduced image included in the image file may be displayed on the monitor display 9 provided in the image bank IB. In this case, the program for attaining the functions shown in FIG. 6 is stored in the image bank IB as well as in the image terminal TM. If the functions shown in FIG. 5 are given to both of the image terminal TM and the image bank IB, a bidirectional image communication between the image terminal TM and the image bank IB is realized: In such case an image transmission from the image terminal TM to the image bank IB is carried out in a process similar to that from the image bank IB to the image terminal TM.

(2) The image terminal TM may decode the encoded image data in parallel with the data transmission from the image bank IB, where the transmitted data are delivered to the decoder means 34Y-34K (36Y-36K) without substantial delay. If the storage capacity of the image memory 24 is relatively large, a plurality of image files may be transmitted from the image bank IB to be stored in the image memory 24. The user searches the image memory 24 for a desired image by displaying the respective reduced images in series.

(3) The file header, the reduced image data and the original image data may be stored and/or transmitted in a form other than serial storage and transmission, as long as these data are correlated with each other. For example, these data may be stored and/or transmitted in parallel. The correlation between these data may be indicated by adding a common reference code to each of them.

(4) For data compression of the reduced image data and/or the original image data, another data compression rule may be used. When the original image data is binary data, the image data may be converted into runlength data through data compression using Modified Huffman Coding. The present invention can be also applied to a monochrome image, an RGB color image and other images. The reduced image data may be so generated as to have only the more significant bits, e.g., 4-bits, for each pixel. In general, when the original image data is gradation data expressing the original image with n bits (n=an integer larger than one) for each pixel, the compression of the reduced image data may be carried out for an i-th bit plane while incrementing the integer i within the range $1 \leq i \leq m$, where m is an integer satisfying $1 \leq m \leq n$. The reduced-and-compressed image data only for the first through m-th bit planes are stored or transmitted. The preferred embodiment described above corresponds to the case where $m = n (= 8)$.

The reduced image data may be compressed through data compression for each scanning line, e.g., by predictive coding, rather than that for each bit plane. Although data compression for the reduced and original image data is preferred for further saving the memory capacity and data transmission time, data compression may be omitted in the image communication system 100.

Accordingly, the present invention may be embodied as various image files, as shown in FIGS. 13-18. An image file $IF_2$ has the most basic structure, and comprises a file header, reduced image data and original image data correlated with each other. Since it is unnecessary to compress the reduced and original image data, a process of producing and transmitting a image file $IF_2$ is simplified as compared with the image file $IF_1$ shown in FIG. 4A.

Figure 14:
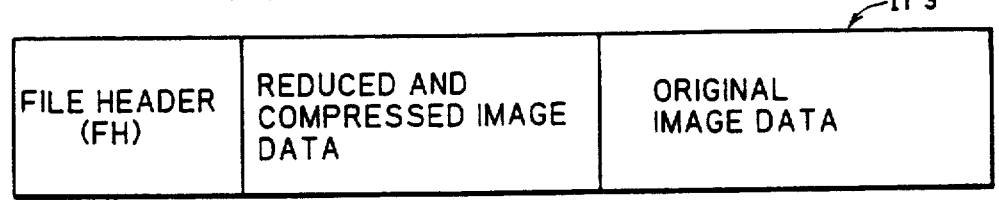
Figure 15:
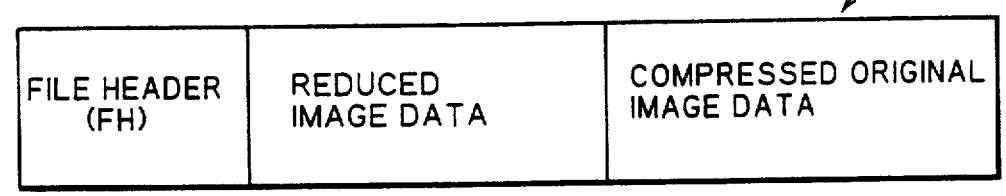
Figure 16:
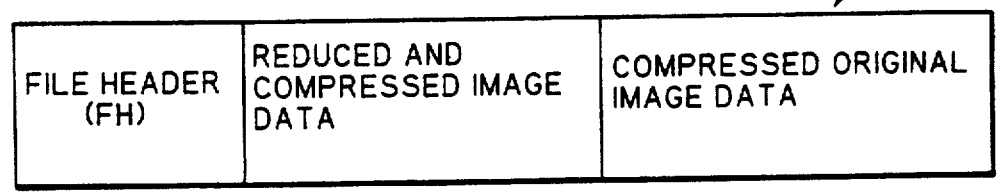

The reduced image data and/or the original image data may be replaced by their respective compressed data in order to reduce the required memory capacity, examples of which are shown in FIGS. 14-16 as image files $IF_3$-$IF_5$.

Figure 17A:
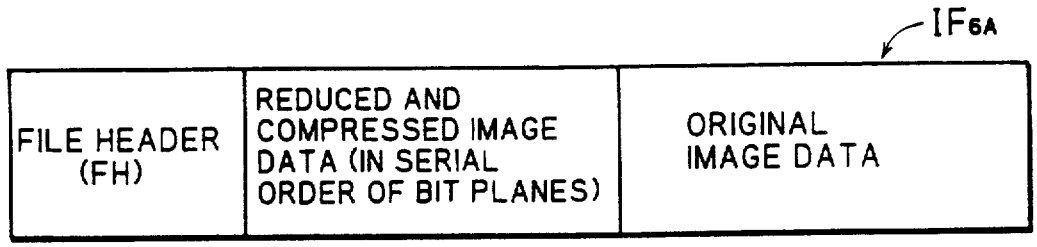
Figure 17B:
Figure 18A:
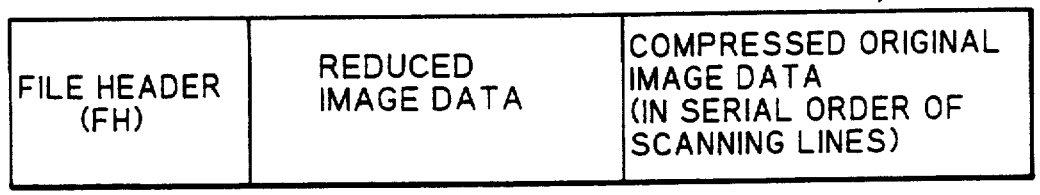
Figure 18B:
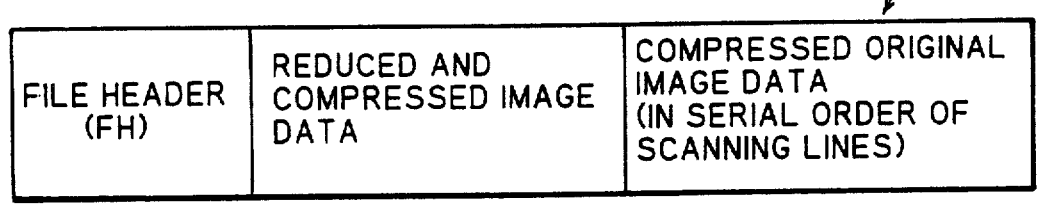

The reduced-and-compressed image data included in the image files $IF_3$ and $IF_5$ may be expressed in serial order of the bit planes, as embodied in image files $IF_{6A}$ and $IF_{6B}$ (FIGS. 17A-17B). On the other hand, when the compressed original image data in the image files $IF_4$ and $IF_5$ is expressed in serial order of scanning lines, image files $IF_{7A}$ and $IF_{7B}$ (FIGS. 18A-18B) are obtained, respectively. As will be understood by those skilled in the art, the image file $IF_1$ shown in FIG. 4A is obtained by combining the reduced-and-compressed image data in the image file $IF_{6A}$ or $IF_{6B}$ with the compressed original image data in the image file $IF_{7A}$ and $IF_{7B}$. The respective advantages of the data compression in serial order of bit planes and that in serial order of scanning lines are already described, and therefore, a redundant description is omitted here.

Although the present invention has been described and illustrated in detail, it is clearly understood that the same is by way of illustration and example only and is not to be taken by way of limitation; the spirit and scope of the present invention being limited only by the terms of the appended claims.

I claim:

1. A method of storing an image file in a memory means which is provided in an image processing system having an image display usable for an image search, the method comprising the steps of:
    (a) preparing first image data expressing an original image;
    (b) generating second image data expressing a reduced image of said original image, a size of said reduced image being equal to or smaller than a display size of said image display;
    (c) producing a file header including identification data for identifying said image file; and
    (d) storing a combination of said file header and said first and second image data in said memory means as said image file.

2. A method in accordance with claim 1, wherein the step (b) includes the steps of:
 (b-1) generating reduced image data expressing said reduced image for each pixel; and
 (b-2) compressing said reduced image data to generate reduced-and-compressed image data as said second image data.

3. A method in accordance with claim 2, wherein the step (a) includes the steps of:
 (a-1) preparing original image data expressing said original image for each pixel; and
 (a-2) compressing said original image data to generate compressed original image data as said first image data.

4. A method in accordance with claim 3, wherein the step (b-1) includes the step of:
 (b-1-1) taking a weighted average of said original image data every two or more pixels to generate said reduced image data.

5. A method in accordance with claim 4, wherein;
 said original image data is gradation data expressing said original image with n bits for each pixel, where n is an integer larger than one;
 said reduced image data includes a plurality of n bit data expressing gradation of said reduced image for each pixel; and
 the step (b-2) is conducted in serial order of bit planes of said reduced image data.

6. A method in accordance with claim 5, wherein the step (b-2) includes the steps of:
 (b-2-1) extracting respective i-th significant bits from said plurality of n bit data, where i is an integer;
 (b-2-2) compressing a bit plane consisting of said respective i-th significant bits to generate i-th compressed data; and
 (b-2-3) repeating the steps (b-2-1) and (b-2-2) while incrementing i from one to m, where m is an integer satisfying $1 \leq m \leq n$, said reduced-and-compressed image data including said i-th compressed data for all of i satisfying $1 \leq i \leq m$.

7. A method in accordance with claim 6, wherein the integers m and n are identical with each other.

8. A method in accordance with claim 7, wherein the step (b-2-2) includes the step of:
 encoding said bit plane into run-length codes.

9. A method in accordance with claim 8, wherein;
 a plurality of scanning lines are defined on said original image;
 the step (a-2) includes the step of:
 (a-2-1) compressing said original image data in serial order of scanning lines.

10. A method in accordance with claim 9, wherein the step (a-2-1) includes the step of:
 encoding said original image data in accordance with a predictive coding rule.

11. A method of transmitting image data through a transmission path to an image processing system in the form of an image file, the image processing system having an image display usable for an image search, the method comprising the steps of:
 (a) preparing first image data expressing an original image;
 (b) generating second image data expressing a reduced image of said original image, a size of said reduced image being equal to or smaller than a display size of said image display;
 (c) producing a file header including identification data for identifying said image file; and
 (d) transmitting a combination of said file header and said first and second image data to said image processing system through said transmission path as said image file.

12. A method in accordance with claim 11, wherein the step (b) includes the steps of:
 (b-1) generating reduced image data expressing said reduced image for each pixel; and
 (b-2) compressing said reduced image data to generate reduced-and-compressed image data as said second image data.

13. A method in accordance with claim 12, wherein the step (a) includes the steps of:
 (a-1) preparing original image data expressing said original image for each pixel; and
 (a-2) compressing said original image data to generate compressed original image data as said first image data.

14. A method in accordance with claim 13, wherein the step (a-1) includes the step of:
 (a-1-1) taking a weighted average of said original image data every two or more pixels to generate said reduced image data.

15. A method in accordance with claim 14, wherein;
 said original image data are gradation data expressing said original image with n bits for each pixel, where n is an integer larger than one;
 said reduced image data includes a plurality of n bit data expressing gradation of said reduced image for each pixel; and
 the step (b-2) is conducted in serial order of bit planes of said reduced image data.

16. A method in accordance with claim 15, wherein the step includes the steps of:
 (b-2-1) extracting respective i-th significant bits from said plurality of n bit data, wherein i is a integer;
 (b-2-2) compressing a bit plane consisting of said respective i-th significant bits to generate i-th compressed data; and
 (b-2-3) repeating the steps (b-2-2) while incrementing i from one to m, where m is an integer satisfying $1 \leq m \leq n$, said reduced-and-compressed image data including said i-th compressed data for all of i satisfying $1 \leq m \leq n$.

17. A method in accordance with claim 16, wherein the integers m and n are identical with each other.

18. A method in accordance with claim 17, wherein the step (d) includes the steps of:
 (d-1) transmitting said file header and said reduced-and-compressed image data to said image processing system; and
 (d-2) transmitting said compressed original image data to said image processing system after the step (d-1) is completed.

19. A method in accordance with claim 18, wherein the step (d-1) includes the steps of:
 (d-1-1) transmitting said file header to said image processing system; and
 (d-1-2) transmitting said i-th compressed data for all of i satisfying $1 \leq i \leq m$ to said image processing system in an ascending order of i.

20. An image search system useful for searching an image file for a desired original image, the system comprising:
 (a) an image display having a display plane;
 (b) means for generating first image data expressing a given original image;

(c) means for generating second image data expressing a reduced image of said original image, a size of said original image being equal to or smaller than a size of said display pane;
(d) means for generating a file header including identification data for identifying said image file;
(e) memory means for storing a combination of said file header and said first and second image data as said image file; and
(f) means for reading out said second image data from said memory means to deliver said second image data to said image display, whereby said reduced image is displayed on said display plane for an image search.

21. An image search system in accordance with claim 20, wherein said means (c) includes:
(c-1) means for generating reduced image data expressing said reduced image for each pixel; and
(c-2) means for compressing said reduced image data to generate said second image data.

22. An image search system in accordance with claim 21, wherein:
said original image is gradation data expressing a respective gradation density of said original image for each pixel;
said reduced image data includes a plurality of n bit data expressing gradation density of said reduced image for each pixel, where n is an integer larger than one; and
said means (c-2) comprises:
(c-2-1) means for extracting respective i-th significant bits from said plurality of n bit data, where i is an integer;
(c-2-2) means for compressing a bit plane consisting of said respective i-th significant bits to generate i-th compressed data; and
(c-2-3) means for enabling said means (C-2-1) and (C-2-2) while
incrementing i from one to m, where m is an integer satisfying $1 \leq m \leq n$, said second image data including i-th compressed data for all of i satisfying $1 \leq i \leq m$.

23. An image search system in accordance with claim 22, wherein said means (f) includes:
(f-1) means for delivering said i-th compressed data for all of i satisfying $1 \leq m \leq n$ to said image display in an ascending order of i, whereby the gradation density of said reduced image displayed on said display on said display plane becomes finer step by step.

24. An image search system in accordance with claim 23, further comprising:
(g) means for disabling said means (f-1) in response to a command signal inputted into said image search system.

25. An image search system in accordance with claim 24, further comprising:
(h) means for receiving said first and second image data and said file header from said means (b), (c) and (d), respectively;
(i) means for transmitting said file header, said second image data and said first image data from said means (h) to said means (e) in that order,
(j) means for inputting said command signal by a manual operation; and
(k) means for disabling said means (i) in response to said command signal.

* * * * *